(12) United States Patent
Gerard

(10) Patent No.: US 10,154,088 B2
(45) Date of Patent: Dec. 11, 2018

(54) SYSTEM AND METHOD FOR MIGRATING AN AGENT SERVER TO AN AGENT CLIENT DEVICE

(71) Applicant: OL SECURITY LIMITED LIABILITY COMPANY, Dover, DE (US)

(72) Inventor: Mark Gerard, Plano, TX (US)

(73) Assignee: OL SECURITY LIMITED LIABILITY COMPANY, Dover, DE (US)

(*) Notice: Subject to any disclaimer, the term of this patent is extended or adjusted under 35 U.S.C. 154(b) by 0 days.

(21) Appl. No.: 15/903,684

(22) Filed: Feb. 23, 2018

(65) Prior Publication Data
US 2018/0248944 A1 Aug. 30, 2018

Related U.S. Application Data

(63) Continuation of application No. 15/187,596, filed on Jun. 20, 2016, now Pat. No. 9,948,712, which is a continuation of application No. 12/629,945, filed on Dec. 3, 2009, now Pat. No. 9,372,728.

(51) Int. Cl.
G06F 15/177 (2006.01)
H04L 29/08 (2006.01)
G06F 9/48 (2006.01)
H04L 29/06 (2006.01)

(52) U.S. Cl.
CPC ........ *H04L 67/1095* (2013.01); *G06F 9/4862* (2013.01); *H04L 67/42* (2013.01)

(58) Field of Classification Search
USPC .......................................... 709/221
See application file for complete search history.

(56) References Cited

U.S. PATENT DOCUMENTS

| | | | | |
|---|---|---|---|---|
| 6,424,988 | B2 * | 7/2002 | Lurndal | G06F 9/4843 714/E11.072 |
| 6,601,093 | B1 * | 7/2003 | Peters | H04L 29/12113 709/220 |
| 6,775,673 | B2 * | 8/2004 | Mahalingam | G06F 17/30067 |
| 6,892,230 | B1 * | 5/2005 | Gu | H04L 12/2805 370/254 |
| 6,909,721 | B2 * | 6/2005 | Ekberg | H04W 48/16 370/313 |
| 6,950,991 | B2 * | 9/2005 | Bloomfield | G06F 9/541 715/738 |
| 6,970,434 | B1 * | 11/2005 | Mahany | H04L 1/0002 370/256 |

(Continued)

Primary Examiner — Alicia Baturay
(74) Attorney, Agent, or Firm — Schwabe, Williamson & Wyatt

(57) ABSTRACT

In a network of mobile agents, data integrity can be improved by providing an agent server that can migrate between devices operating in the region of interest (ROI). The agent server distributes agent clients onto devices in the ROI and provides agent server services to the agent clients, including receiving and storing data from the agents. When the agent server device is to leave the ROI, the agent server can migrate to any device executing an agent client and continue to provide the agent server services, including data collection and aggregation, from the device to which the agent server has migrated.

20 Claims, 6 Drawing Sheets

(56) References Cited

U.S. PATENT DOCUMENTS

| | | | | |
|---|---|---|---|---|
| 6,985,750 | B1* | 1/2006 | Vicknair | H04W 8/20 370/310 |
| 7,065,541 | B2* | 6/2006 | Gupta | G06F 17/30306 |
| 7,082,604 | B2* | 7/2006 | Schneiderman | G06F 9/4862 709/202 |
| 7,089,298 | B2* | 8/2006 | Nyman | H04L 29/12264 709/220 |
| 7,296,068 | B1* | 11/2007 | Sarma | G06F 3/061 709/223 |
| 7,318,095 | B2* | 1/2008 | Husain | G06F 11/2033 709/220 |
| 7,412,224 | B2* | 8/2008 | Kotola | H04W 4/008 370/338 |
| 7,434,087 | B1* | 10/2008 | Singh | G06F 11/1443 714/4.11 |
| 7,440,416 | B2* | 10/2008 | Mahany | H04L 1/0002 370/235 |
| 7,480,816 | B1* | 1/2009 | Mortazavi | G06F 11/1482 714/10 |
| 7,487,230 | B2* | 2/2009 | Gu | H04L 12/2805 709/220 |
| 7,492,777 | B2* | 2/2009 | Ekberg | H04W 48/16 370/230 |
| 7,539,481 | B2* | 5/2009 | Abhishek | H04W 48/16 370/328 |
| 7,543,174 | B1* | 6/2009 | van Rietschote | G06F 11/2025 709/223 |
| 7,555,529 | B2* | 6/2009 | Bloomfield | G06F 9/542 709/217 |
| 7,558,846 | B2* | 7/2009 | Gu | H04L 12/2805 709/220 |
| 7,570,627 | B2* | 8/2009 | Welborn | H04B 1/7176 370/329 |
| 7,602,756 | B2* | 10/2009 | Gu | H04L 12/2805 370/338 |
| 7,613,772 | B2* | 11/2009 | Bartram | H04L 67/104 370/390 |
| 7,685,279 | B2* | 3/2010 | Miltonberger | G07F 17/32 370/242 |
| 7,685,288 | B2* | 3/2010 | Kakivaya | H04L 67/16 709/204 |
| 7,801,077 | B2* | 9/2010 | Rentel | H04W 72/082 370/329 |
| 7,801,082 | B2* | 9/2010 | Jeon | H04W 36/12 370/331 |
| 7,804,849 | B2* | 9/2010 | Mahany | H04L 1/0002 370/230 |
| 7,925,772 | B2* | 4/2011 | Fujita | H04L 12/2807 709/231 |
| 7,966,368 | B2* | 6/2011 | Su | H04L 12/18 709/204 |
| 7,969,911 | B2* | 6/2011 | Mahany | H04L 1/0002 370/254 |
| 8,009,658 | B2* | 8/2011 | Welborn | H04B 1/7176 370/336 |
| 8,601,101 | B1* | 12/2013 | Singh | H04L 69/40 370/254 |
| 8,824,449 | B2* | 9/2014 | van der Wateren | H04J 3/0655 370/350 |
| 9,372,728 | B2* | 6/2016 | Gerard | G06F 9/4862 |
| 9,948,712 | B2* | 4/2018 | Gerard | G06F 9/4862 |
| 2002/0044549 | A1* | 4/2002 | Johansson | H04L 45/02 370/386 |
| 2002/0156875 | A1* | 10/2002 | Pabla | H04L 1/24 709/220 |
| 2002/0169889 | A1* | 11/2002 | Yang | H04L 29/06 709/244 |
| 2003/0233433 | A1* | 12/2003 | Halpern | G06F 9/4843 709/222 |
| 2004/0098447 | A1* | 5/2004 | Verbeke | G06F 9/5055 709/201 |
| 2004/0139167 | A1* | 7/2004 | Edsall | G06F 17/30197 709/212 |
| 2006/0031429 | A1* | 2/2006 | Ayyagari | H04W 84/20 709/220 |
| 2006/0176852 | A1* | 8/2006 | Wu | H04L 63/0853 370/331 |
| 2007/0233626 | A1* | 10/2007 | Rupp | G06Q 10/10 706/20 |
| 2007/0245003 | A1* | 10/2007 | Kashyap | H04L 67/14 709/223 |
| 2009/0037562 | A1* | 2/2009 | Lobbert | H04L 29/12018 709/220 |
| 2009/0049158 | A1* | 2/2009 | Krishnaswamy | H04W 84/22 709/220 |
| 2009/0222537 | A1* | 9/2009 | Watkins | H04L 29/12311 709/221 |
| 2009/0238153 | A1* | 9/2009 | Sim | H04W 84/20 370/336 |
| 2011/0137972 | A1 | 6/2011 | Gerard | |
| 2011/0173305 | A1* | 7/2011 | Matuszewski | H04L 45/02 709/221 |
| 2011/0208846 | A1* | 8/2011 | Ito | H04L 29/1232 709/222 |
| 2017/0099349 | A1 | 4/2017 | Gerard | |

* cited by examiner

SYSTEM AND METHOD FOR MIGRATING AN AGENT SERVER TO AN AGENT CLIENT DEVICE

RELATED APPLICATIONS

This application is a continuation of and claims priority to U.S. patent application Ser. No. 15/187,596, filed Jun. 20, 2016, now, U.S. Pat. No. 9,948,712 which is a continuation of and claims priority to U.S. patent application Ser. No. 12/629,945, filed Dec. 3, 2009, now U.S. Pat. No. 9,372,728, each disclosure of which is incorporated by reference herein in its entirety.

FIELD OF THE INVENTION

This disclosure relates to mobile agent networks and more particularly to managing data within the network.

BACKGROUND OF THE INVENTION

Agents running on mobile devices within a region of interest (ROI) can move or copy themselves to other devices that enter the ROT. Typically, each mobile device acts on its own without any central authority or role in the ROI. Content acquired between various agents can be fragmented and/or duplicated as agents move from mobile to mobile within the ROI.

What is required is a system and method that can establish a distributed client/server relationship between various Agents that persist within a ROI in order to manage the integrity of the data collected over time by agent activity.

SUMMARY OF THE INVENTION

In one aspect of the disclosure, there is provided a method for managing data integrity of one or more agent clients within a region of interest. The method comprises providing an agent server on a first device in the region of interest, storing data derived from at least one agent client with the agent server, and migrating the agent server and the stored data to a second device in the region of interest prior to the first device leaving the region of interest.

In one aspect of the disclosure, there is provided an agent server configured to provide at least one agent server service from a first device to at least one agent client on a second device in a region of interest, migrate from the first device to a third device, and provide the at least one agent server service from the third device to the at least one agent client on the second device.

In one aspect of the disclosure, there is provided a computer-readable medium comprising computer-executable instructions for execution by a first processor of a first device, that, when executed, cause the first processor to receive an agent client from a second processor executing an agent server, execute the agent client, receive an instance of the agent server from the second processor, and execute the agent server instance.

BRIEF DESCRIPTION OF THE DRAWINGS

Reference will now be made, by way of example only, to specific embodiments and to the accompanying drawings in which.

DETAILED DESCRIPTION OF THE INVENTION

Early incarnations of agent applications draw from conventional client/server models. Modern agent-based solutions are typically architected in a different manner from traditional client/server solutions found on traditional web-based application models. An agent requires the use of other capable devices that are willing to participate within the ROI in order to persist itself. If all agents autonomously collect information from their sensors and behave independently or in concert with other agents toward a goal while also potentially moving among devices in order to persist presence within the ROI, the information collected can become redundant and/or fragmented and introduce unnecessary complexity or noise in decision-making processes.

Figure 1:
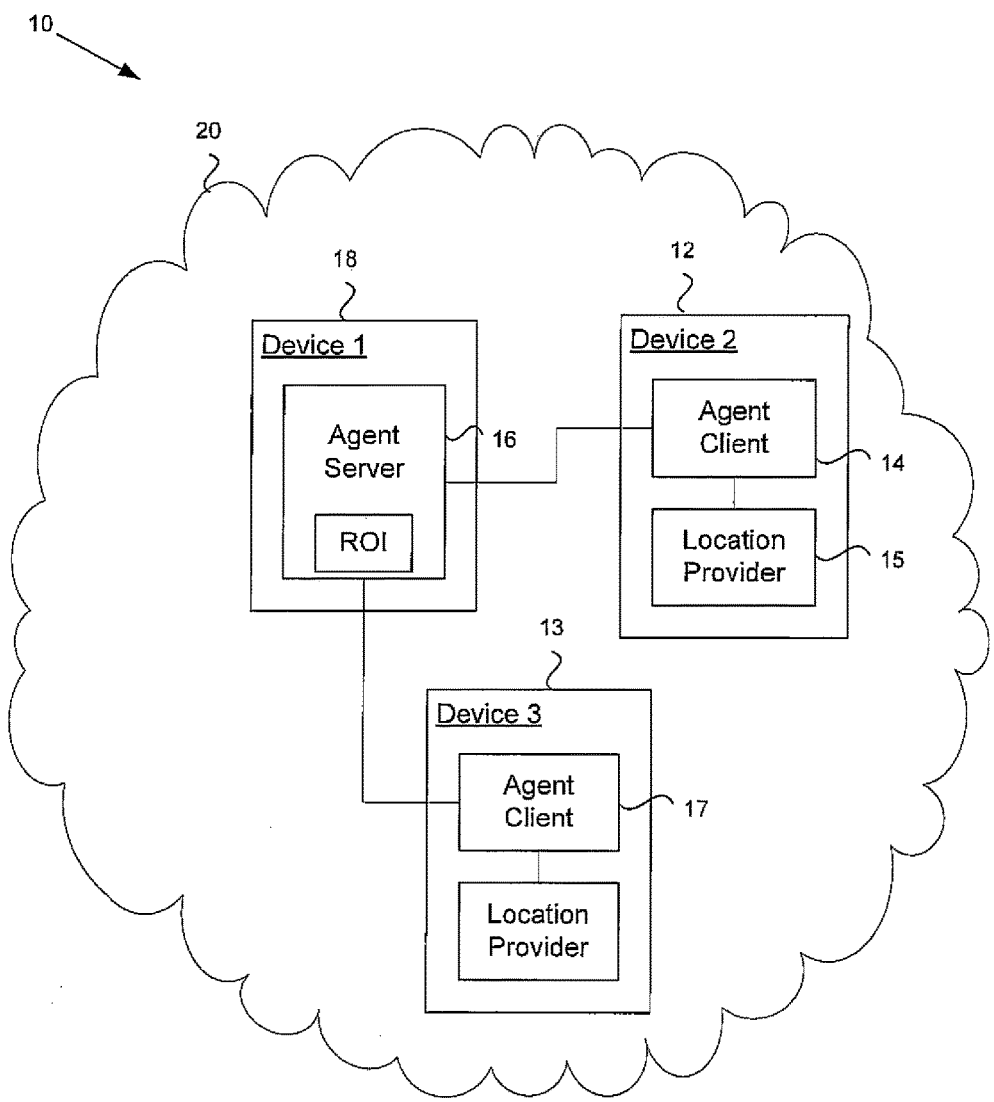
FIG. 1 illustrates a network of agents including an agent server.

A system 10 in accordance with an embodiment of the disclosure is illustrated in FIG. 1. In the system 10, there may be any number of devices 12, 13 on which instances of a client agent (14,17 respectively) are executed within a region of interest (ROI) 20. Typically, the devices 12, 13 will be mobile devices, such as cellular phones, personal digital assistants (PDA), netbooks, or laptops though in some cases, the devices 12 may be static devices. The devices 12, 13 include a location provider 15 that enable the devices 12, 13 to know their position. The location provider 15 may be capable of determining the device's location through any suitable means such as through GPS, cellular system, near field radio, digital/video camera, triangulation and the like.

There may be defined one agent that persists a centralized role and/or acts as a centralized server, termed an agent server 16 herein. The agent server 16 executes on a mobile device 18, which may be any device similar to the devices 12, 13. The agent server 16 can be configured to provide lifecycle management within the ROI 20 and also actively manage incoming requests from Agent Client/Proxy instances. The agent server 16 implements server-side behaviors and accepts requests for those behaviors from Agent Client/Proxy instances. For their part, the agent client/proxies 13, 17 may act as a simple proxy to the Agent Server 16 and/or can provide a programmatic interface to other applications executing on the client device (a service). The agents 14 use access to the client device's hardware and the Agent Server's ROI to accept/reject requests from other applications on the client device.

The agents 14 may communicate with the agent server through any suitable protocols and processes known to a person skilled in the art, such as (SOAP, XML, HTTP, HTTPS, etc) and it is not considered that further definition or description of these protocols and processes is required herein. Typically, an agent client 14,17 will continually seek an agent server, such as by repeatedly submitting an agent participation request as will be described below, until it receives a response from an agent server. The agent server response may tell the client it has entered the boundaries of a ROI.

Figure 2:
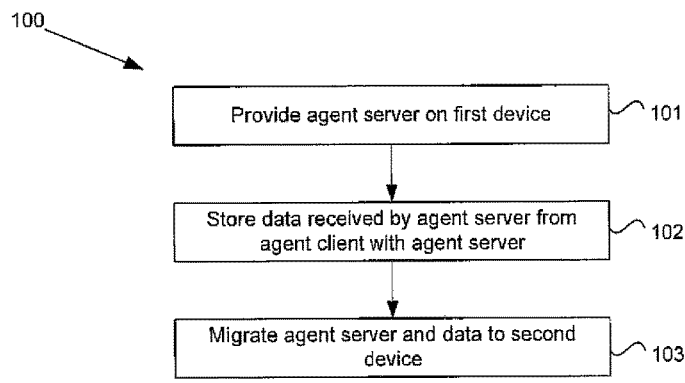
FIG. 2 illustrates a process for managing the network of agents.

A process for managing the network of agents is shown in the flowchart 100 of FIG. 2. At step 101, an agent server is provided on a first device in the region of interest. Data derived from at least one agent client within the region of interest is received and stored with the agent server (step 102). When required, such as prior to the agent server device leaving the ROI, the agent server is migrated to a second device together with the stored data (step 103). Data stored by the agent server may be data directly received from agent clients or may be data that is derived through analysis and interpretation of agent client data.

The agent server initially provides agent server services to agent clients within the network from the first device. After migration, the agent server 16 is able to continue providing the agent services from the device to which it has migrated. The services provided by the agent server 16 to the agent clients 14, 17 will depend on the application and implementation of the agent client network. Examples of agent server services may include, without limitation, traffic congestion and traffic emergency management, fire emergency management and rescue management as well as many other location dependent or ROI dependent services.

Figure 3:
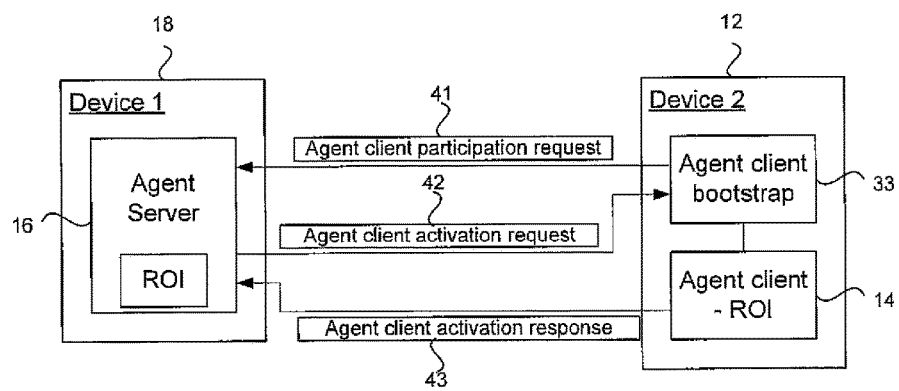
FIG. 3 illustrates a message flow for distributing an agent client.
Figure 4:
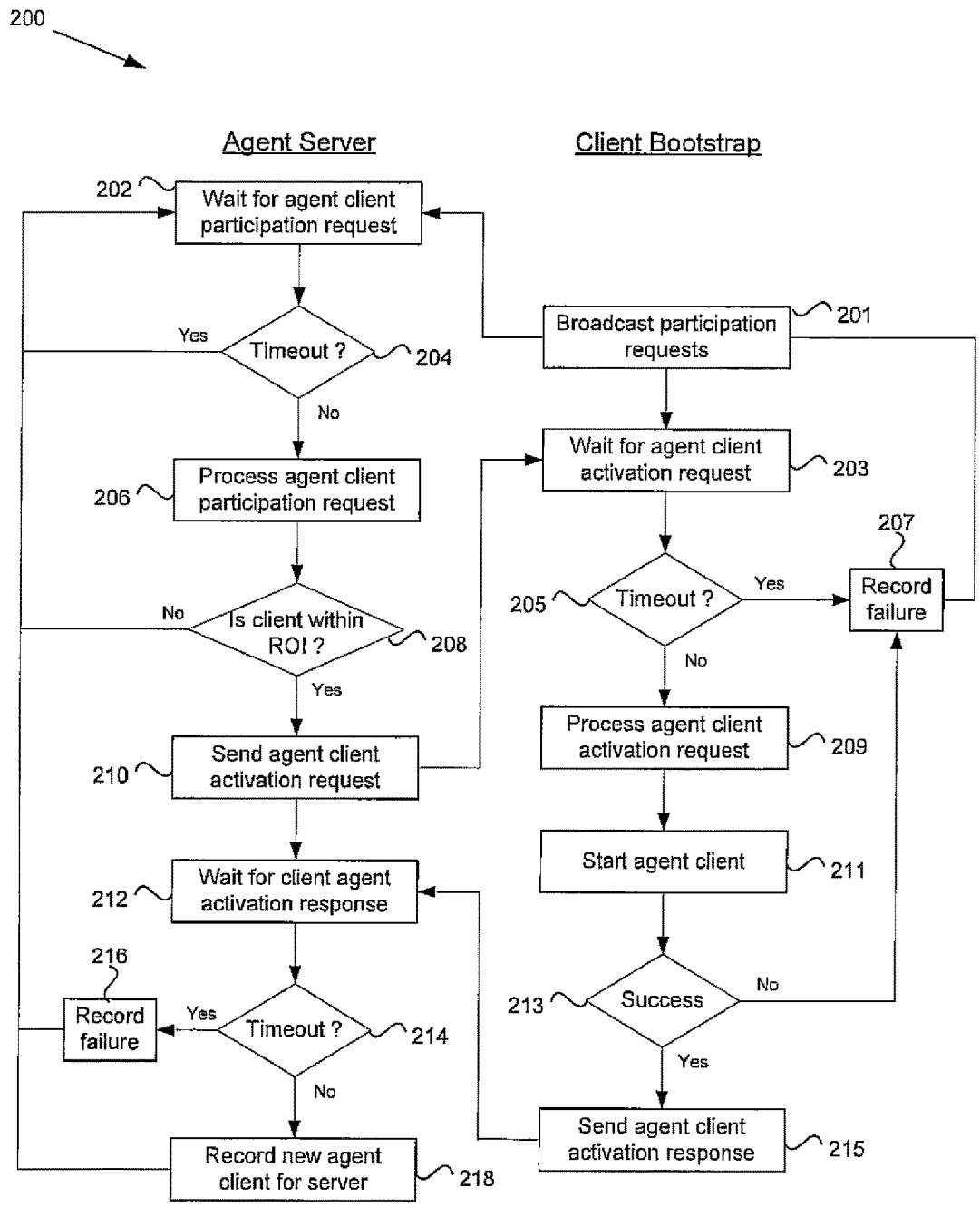
FIG. 4 illustrates a process flow for distributing an agent client.

As mentioned above, a function of the agent server 16 is to distribute client agents 14 across participant devices 12. Message flow for this task is illustrated in FIG. 3 and the corresponding process is shown in the flowchart 200 of FIG. 4. At commencement, it is assumed that the agent server 16 is running on Device1 18 and that an agent client bootstrap code 33 is running on Device2 12. The bootstrap code 33 includes a loop in which Device2 12 broadcasts an agent client participation request 41 from the device 12 (step 201) and awaits an agent client activation request in response (step 203). If no agent client activation request is received, then a timeout occurs (step 205), a failure is recorded 207 and the bootstrap code returns to step 201. Device2 may broadcast the participation request irrespective of whether it is in the ROI or not. The agent client participation request 41 specifies an ID of the device 12 and a location, as determined by the device's location provider.

The agent server 16 on Device1 18 also executes a loop in which the agent server 16 waits for agent client participation requests 202 until a timeout occurs 204. When Device2 enters the ROI, the participation request 41 is detected by the agent server 16 on Device1 18 (step 206) so that no timeout occurs at step 204. The agent server 16 processes the broadcast participation request 41 and determines if Device2 is within the ROI (step 208). If Device2 is not within the ROI, then the agent server 16 ignores the participation request and returns to step 202. If Device2 is within the ROI, then the agent server 16 responds with an agent client activation request (step 210) indicating the agent client ID and ROI and including a serialized instance of the agent client. The agent server 16 then waits for an agent client activation response 212 and records a failure 216 if a timeout occurs 214.

If the agent client activation request 42 is received into Device2 before the timeout at step 205, then the bootstrap code 33 processes the agent client activation request (step 209) including deserializing and activating the agent client 14 (step 211). If the agent client cannot be successfully activated, then a failure is recorded 207 and the client bootstrap returns to step 201, thereby causing the timeout 214 in the agent server 16. If the agent client 14 is successfully activated in Device2 12 (step 213), then the agent client 14 generates and sends an agent client activation response 43 to the agent server 16 (step 215). The agent client activation response 43 indicates the agent client ID, the device ID of Device2 12 and a success or failure indicator. If the agent client activation response 43 is received in the agent server 16 before the timeout 214, then the agent server records the new agent client for the server 218, including recording a reference that associates the device ID with the agent client ID. The Agent Server uses the reference for future communication with other activated agents in the ROI.

Once the Agent Server has distributed the Agent Client, the Agent Server and Agent Client form part of a framework for any number of application-specific features. The standard operating interaction between the agent server and the agent client will thus depend on the application (or the goal of the Agent) in the region. The Agent Server defines the boundary and existence of the ROI and provides a data aggregator for all Agent Clients in the ROI. Thus, when an agent client leaves the ROI, the data accumulated by the agent client is retained in the agent server which collectively manages all the fragments of information from the various agent clients.

Figure 5:
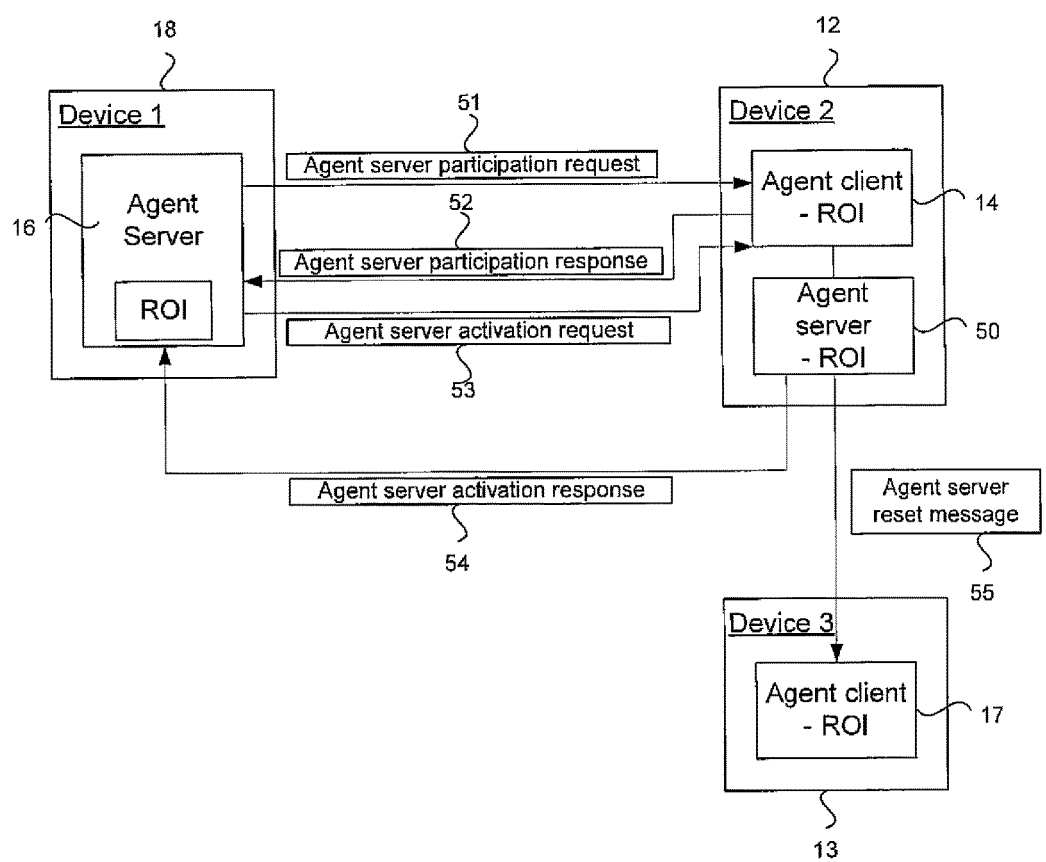
FIG. 5 illustrates a message flow for migrating an agent server.
Figure 6:
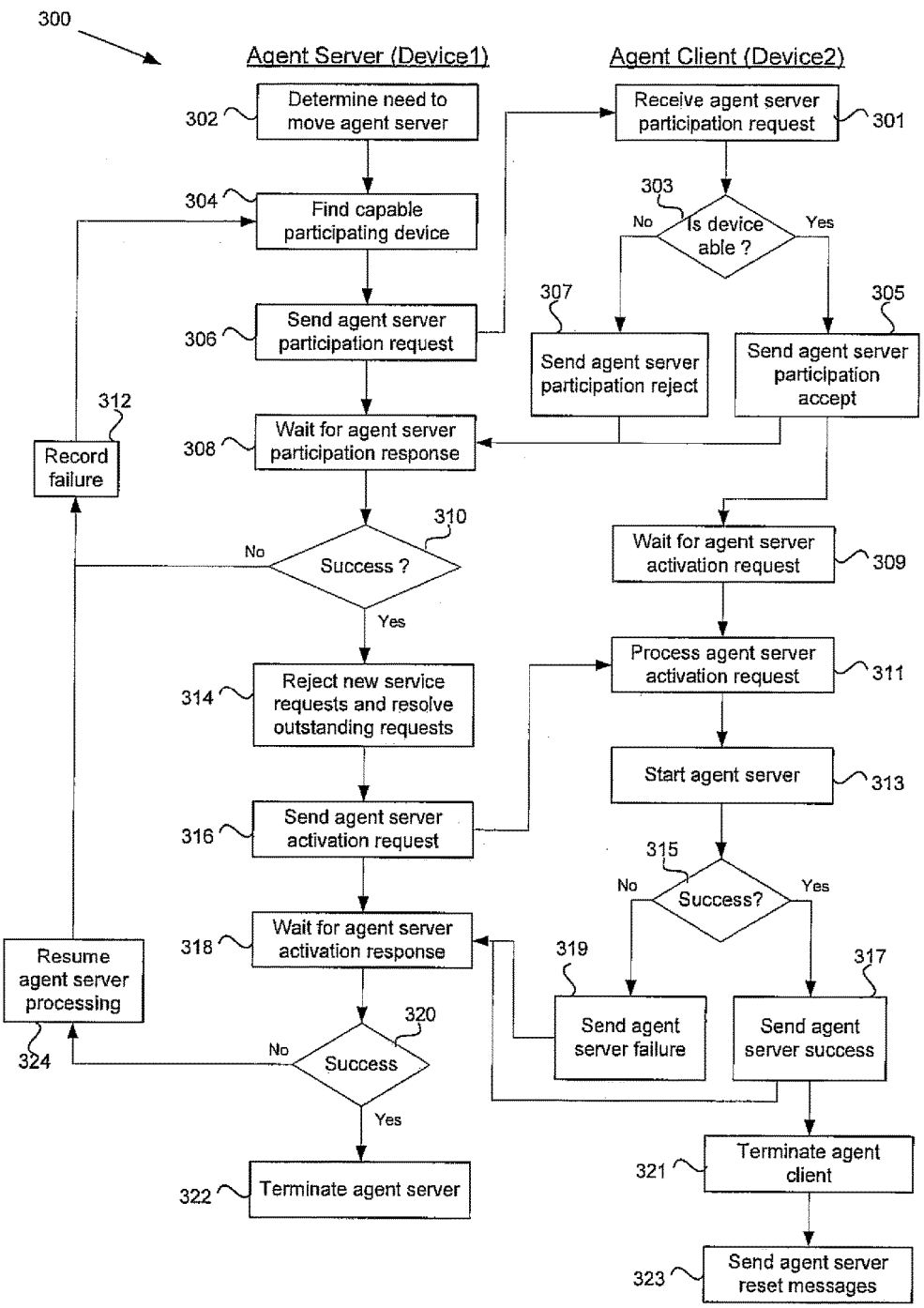
FIG. 6 illustrates a process flow for migrating an agent server.

There will be times when it is necessary for the agent server 16 to migrate from its device 18 to another device 12 in order for the agent server 16 to persist within the ROI 20. Examples of when an agent server may need to migrate include an impending near-term hardware failure (power supply failure, decreased bandwidth, etc) or as a result in the user's change of command (e.g. when a fire chief enters the ROI for an emergency and needs to take charge). For example, with reference to FIG. 1, the agent server 16 may be executing on Device1 18 with instances of the agent client 13,17 executing on Device2 12 and Device3 13 respectively, all of which reside in the ROI 20. FIG. 5 illustrates the message flow of one embodiment when the agent server 16 migrates to another device. A migration process is shown in the flowchart 300 of FIG. 6. At step 302, it is determined that the agent server 16 is to move from Device1 18. Candidate devices include any device currently hosting an agent client, since such devices all reside in the ROI, and a suitable device (e.g. Device2 13) is chosen at step 304. At step 306, the agent server 16 sends an agent server participation request 51 to the agent client 14 on Device2 12. The agent server participation request includes the device ID of Device2 12 and the agent ID currently running on Device2. The agent server 16 waits for a response at step 308 while the agent client 14 receives the agent server participation request 51 at step 301 and determines if the device hosting the agent client 14, i.e. Device2 12 is capable of hosting the agent server 16 (step 303). The agent client 14 sends an agent server participation response 52 indicating if Device2 can host the agent server (step 305) or not (step 307). The agent server participation response identifies the DeviceID of Device2 12, the agent ID of agent client 14 and a value indicating whether the agent client can receive the agent server. Possible values for this value may include YES, NO or NEVER.

If the agent client 14 indicates in the agent server participation response 52 that Device2 12 is capable of hosting the agent server 16, then the agent client 14 proceeds to wait for activity from the agent server 16 (step 309). If the agent server participation response 52 received by the agent server 16 indicates that the agent client 14 is unable to host the agent server (step 310), then a failure is recorded 312 and the agent server process returns to step 304 to search for a next possible candidate host. If the agent server participation response is deemed successful 310, then agent server 16 begins preparations to migrate, including rejecting new service requests and resolving outstanding requests 314. The agent server 16 then sends an agent server activation request 53 to the agent client (step 316), which includes a DeviceID of Device2, a serialized agent server and stored content of the agent server such as agent and device identities of other agents in the ROI, aggregated data collected from other agents, the ROI definition, etc. The agent server 16 then continues to reject further service requests while waiting for an activation response from the agent client 14 (step 318).

The agent client 14 processes the agent client activation request 53 (step 311) by deserializing and activating the agent server 50 on Device2 12 (step 313). An agent server activation response 54 is sent indicating whether the agent server was successfully activated (step 317) or not (step 319). If the agent server 16 receives a successful indication (step 320), then the agent server 16 is terminated on Device1 16 (step 322) or placed on standby. Otherwise, the agent server 16 resumes agent server processing 324 and returns to step 304 to seek another potential candidate device for hosting the agent server.

Once the agent server 50 is successfully activated on the new device, i.e. Device2 12, then the agent client 14 currently running on the device is terminated 321 and agent server reset messages 55 are sent to other agent clients on the network, such as agent client 17 running on Device3 13. The agent server reset messages indicate the old device ID and the new device ID, i.e. Device1 and Device2 respectively, as well as the agent ID of the new agent server 50. The agent server reset message thus causes the agent client 17 on Device3 13 to reference the new agent server 50 on Device2 12. Device3 can then continue receiving agent server services from the agent server, albeit from the new device (Device2).

Because the agent server can migrate with its collected data between devices, the agent server's movement does not necessarily have to impact the integrity of the agent data collected over time by other agents also within the ROI. Furthermore, since the agent clients communicate data to only a single agent server, redundant information between Agents within a ROI can be reduced or eliminated and the agent server can preserve information exclusive to one Agent within the ROI as the Agent leaves the ROI.

Figure 7:
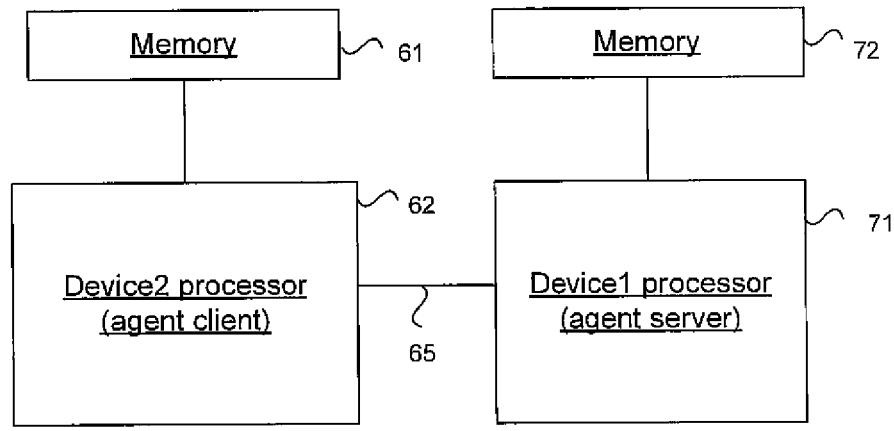
FIG. 7 illustrates an interaction between processes of an agent client device and an agent server device.
Figure 8:
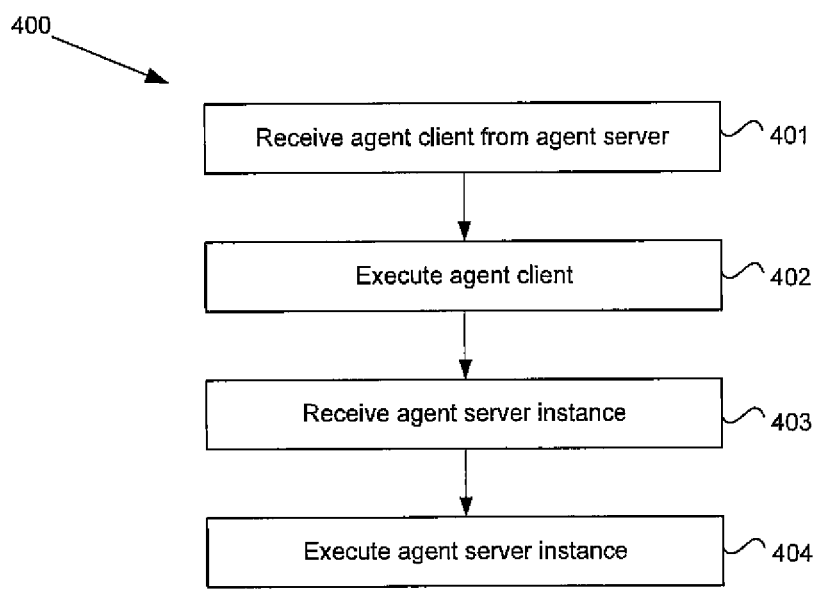
FIG. 8 illustrates an instruction set executable on the agent client device.

The components of the system 10 may be embodied in hardware, software, firmware or a combination of hardware, software and/or firmware. In a hardware embodiment, Device2 12 may include a processor 61 operatively associated with a memory 62 as shown in FIG. 7. The memory 62 may store an instruction set 400 executable by the processor 61 which may include the bootstrap code described above. When executed, the instruction set 400, shown in FIG. 8, causes the processor to receive an agent client from a processor 71 that is executing an agent server, such as a processor of Device1 18. The processor 61 may receive the agent client instance (step 401) from the processor 71 through any suitable communications link 65 of the network. Once received, the processor 61 executes the agent client (step 402). At some later time when the agent server migrates, the processor 61 may receive an instance of the agent server from the Device1 processor 71 (step 403) and execute the agent server instance (step 404). Receiving and executing the agent server instance may cause the Device2 processor 61 to terminate the agent client on the processor 61. The Device2 processor 61 may also notify a third processor (not shown) such as a processor of Device3 13 to cause the third processor to associate the agent server with Device2 so that Device2 is able to provide agent server services to an agent client on Device3.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. An agent client device, comprising:
a memory device configured to store instructions; and
a processing device configured to execute the instructions stored in the memory device to:
identify an agent server participation request from an agent server device;
determine whether the agent client device is able to host an agent server to be migrated from the agent server device;
transmit an agent server participation response to the agent server device in response to determining that the agent client device is able to host the agent server;
identify an agent server activation request including agent server migration data, the agent server activation request originating from the agent server device;
activate the agent server on the agent client device using the agent server migration data from the agent server activation request;
transmit an agent server success response to indicate successful activation of the agent server on the agent client device, the agent server success response transmitted to the agent server device in response to the agent server activation request; and
terminate an agent client executing on the agent client device in response to the server activation request and after the successful activation of the agent server on the agent client device.

2. The agent client device of claim 1, wherein the agent server migration data includes first data that includes a serialized instance of the agent server and second data that is different than the first data.

3. The agent client device of claim 2, wherein the second data includes a device identification identifying the agent client device, an agent server identification identifying the agent server device, a value indicating whether the agent client device can execute the agent server, or a combination thereof.

4. The agent client device of claim 3, wherein the second data includes a device identification identifying the agent client device, an agent server identification identifying the agent server device, a value indicating whether the agent client device can execute the agent server, or a combination thereof.

5. The agent client device of claim 3, wherein the second data includes identification of agents in a region of interest, aggregated data collected from the agents in the region of interest, a definition of the region of interest, or a combination thereof.

6. The agent client device of claim 3, wherein the processing device is configured to execute the instructions stored in the memory further to deserialize the agent server instance of the first data.

7. The agent client device of claim 5, wherein the processing device is configured to execute the instructions stored in the memory further to transmit or identify one or more communications to or from, respectively, one or more remote agent client devices of the agents in the region of interest.

8. An apparatus, comprising:
an electronic device, including:
a memory device configured to store instructions; and
a processing device configured to execute the instructions stored in the memory device to:
identify an agent server participation request received over a network from an agent server device;
determine whether the electronic device is able to host an agent server to be migrated over the network from the agent server device;
transmit an agent server participation response over the network to the agent server device in response to determining that the electronic device is able to host the agent server;
identify an agent server activation request including agent server migration data, the agent server activation request originating from the agent server device and received over the network;
activate the agent server on the electronic device using the agent server migration data from the agent server activation request;
transmit an agent server success response to indicate successful activation of the agent server on the electronic device, the agent server success response transmitted over the network to the agent server device in response to the agent server activation request; and
terminate an agent client executing on the electronic device in response to the server activation request and after the successful activation of the agent server on the electronic device.

9. The apparatus of claim 8, wherein the agent server migration data includes first data that includes a serialized instance of the agent server and second data that is different than the first data.

10. The apparatus of claim 9, wherein the second data includes a device identification identifying the electronic device, an agent server identification identifying the agent server device, a value indicating whether the electronic device can execute the agent server, or a combination thereof.

11. The apparatus of claim 10, wherein the second data includes a device identification identifying the electronic device, an agent server identification identifying the agent server device, a value indicating whether the electronic device can execute the agent server, or a combination thereof.

12. The apparatus of claim 10, wherein the second data includes identification of agents in a region of interest, aggregated data collected from the agents in the region of interest, a definition of the region of interest, or a combination thereof.

13. The apparatus of claim 10, wherein the processing device is configured to execute the instructions stored in the memory further to deserialize the agent server instance of the first data.

14. The apparatus of claim 13, wherein the processing device is configured to execute the instructions stored in the memory further to transmit or identify one or more communications to or from, respectively, one or more remote electronic devices of the agents in the region of interest.

15. The apparatus of claim 8, wherein the electronic device comprises a mobile electronic device.

16. The apparatus of claim 15, wherein the electronic device is configured to determine a location of the electronic device using a global positioning system, a cellular system, a near field radio, a digital/video camera, or triangulation.

17. The apparatus of claim 15, wherein the mobile electronic device comprises a cellular phone.

18. The apparatus of claim 15, wherein the mobile electronic device comprises a personal digital assistant (PDA).

19. The apparatus of claim 15, wherein the mobile electronic device comprises a netbook or a laptop.

20. An electronic device, comprising:
means for determining a geographic location of the electronic device; and
circuitry to:
identify an agent server participation request received over a network from an agent server device;
determine whether the electronic device is able to host an agent server to be migrated over the network from the agent server device;
transmit an agent server participation response over the network to the agent server device in response to determining that the electronic device is able to host the agent server;
identify an agent server activation request including agent server migration data, the agent server activation request originating from the agent server device and received over the network;
activate the agent server on the electronic device using the agent server migration data from the agent server activation request;
transmit an agent server success response to indicate successful activation of the agent server on the electronic device, the agent server success response transmitted over the network to the agent server device in response to the agent server activation request; and
terminate an agent client executing on the electronic device in response to the server activation request and after the successful activation of the agent server on the electronic device.

* * * * *